Jan. 26, 1954 F. KESSLER ET AL 2,667,539

AUTOMATIC TELEPHONE CONNECTOR CIRCUIT

Filed Jan. 20, 1950 4 Sheets-Sheet 1

INVENTORS.
FRANK KESSLER
THEODOR FRANKEL
BY Winfred T. Powell
ATTORNEY

Jan. 26, 1954 F. KESSLER ET AL 2,667,539

AUTOMATIC TELEPHONE CONNECTOR CIRCUIT

Filed Jan. 20, 1950 4 Sheets-Sheet 2

TANDEM OFFICE

INVENTORS.
FRANK KESSLER
THEODOR FRANKEL
BY
Winfred T. Powell
ATTORNEY

Jan. 26, 1954 F. KESSLER ET AL 2,667,539

AUTOMATIC TELEPHONE CONNECTOR CIRCUIT

Filed Jan. 20, 1950 4 Sheets-Sheet 3

CONNECTOR

INVENTORS.
FRANK KESSLER
THEODOR FRANKEL
BY
Winfred T. Powell
ATTORNEY

Jan. 26, 1954 F. KESSLER ET AL 2,667,539

AUTOMATIC TELEPHONE CONNECTOR CIRCUIT

Filed Jan. 20, 1950 4 Sheets-Sheet 4

CONNECTOR

INVENTORS.
FRANK KESSLER
THEODOR FRANKEL
BY
Winfred T. Powell
ATTORNEY

Patented Jan. 26, 1954 2,667,539

UNITED STATES PATENT OFFICE 2,667,539

AUTOMATIC TELEPHONE CONNECTOR CIRCUIT

Frank Kessler and Theodor Frankel, Rochester, N. Y., assignors to Stromberg-Carlson Company, a corporation of New York Application January 20, 1950, Serial No. 139,701

16 Claims. (Cl. 179—18)

This invention relates to telephone systems and is more particularly concerned with improved connector circuits which can be employed with advantage in automatic telephone systems of the character disclosed in the copending application of W. W. Pharis, Serial No. 139,632, filed January 20, 1950.

The chief object of the invention is the provision of simplified connector circuits whereby the cost of the exchange equipment may be reduced without rendering it in any way less reliable.

According to one feature of the invention, a combination local and toll connector is provided for supplying 3-digit party line service, P. B. X trunk hunting on any desired level with night service directory listing, controlled ringing, code or harmonic and bridged or divided circuit ringing.

In accordance with another feature of the invention, certain relays are dual purpose relays for effecting an economy in equipment by having a particular one of these relays perform the same functions as previously performed by a plurality of relays. For example, the BT relay of Fig. 4 of the accompanying drawings is a combined busy test relay and a reversing relay for reversing the connection of the ringing current to the called line in a divided ringing system. Similarly, the YD relay functions as a combined delay relay to mark the end of the secondary or Y stepping of the associated connector switch and as a ringing trip repeater relay for cooperating with the RT relay in the tripping operation. Furthermore, the YD and the BT relays of the connector cooperate in a manner to guard the connector against seizure, after a momentary disconnection of the guarding potential from the incoming sleeve conductor when the release operation of the connector is controlled by the called party when the calling party hangs up first.

Still another object of the present invention is the provision of a circuit arrangement whereby battery is forwarded over a special control conductor to the connector switch for starting the ringing operation on a toll call.

Another feature of the invention relates to a circuit arrangement whereby ringing into a closed loop is prevented except on a call to a P. B. X line (which might have a normally closed loop) in which case ringing can be effected by a control over the above mentioned special control conductor.

Figure 1:
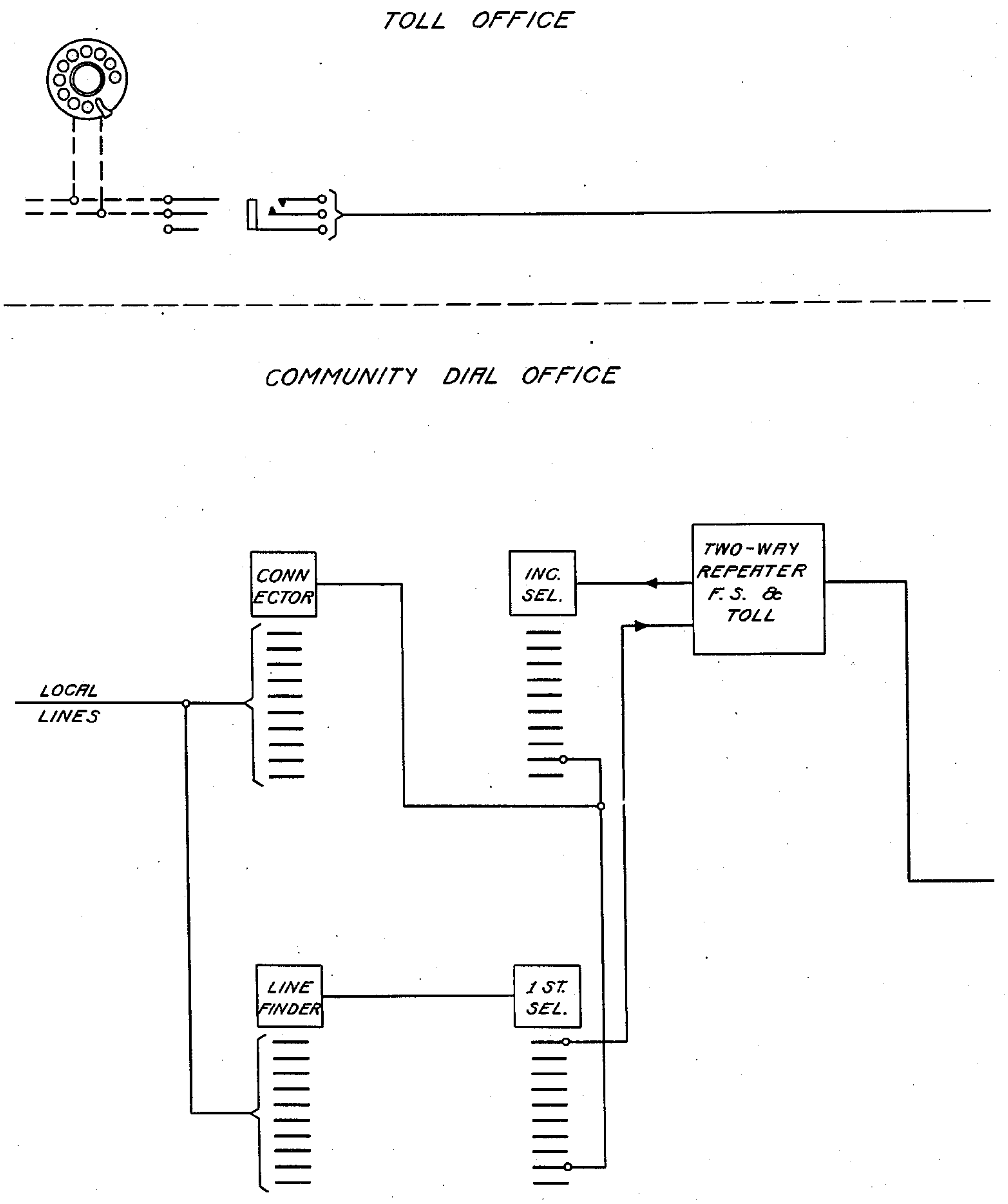
Figure 2:
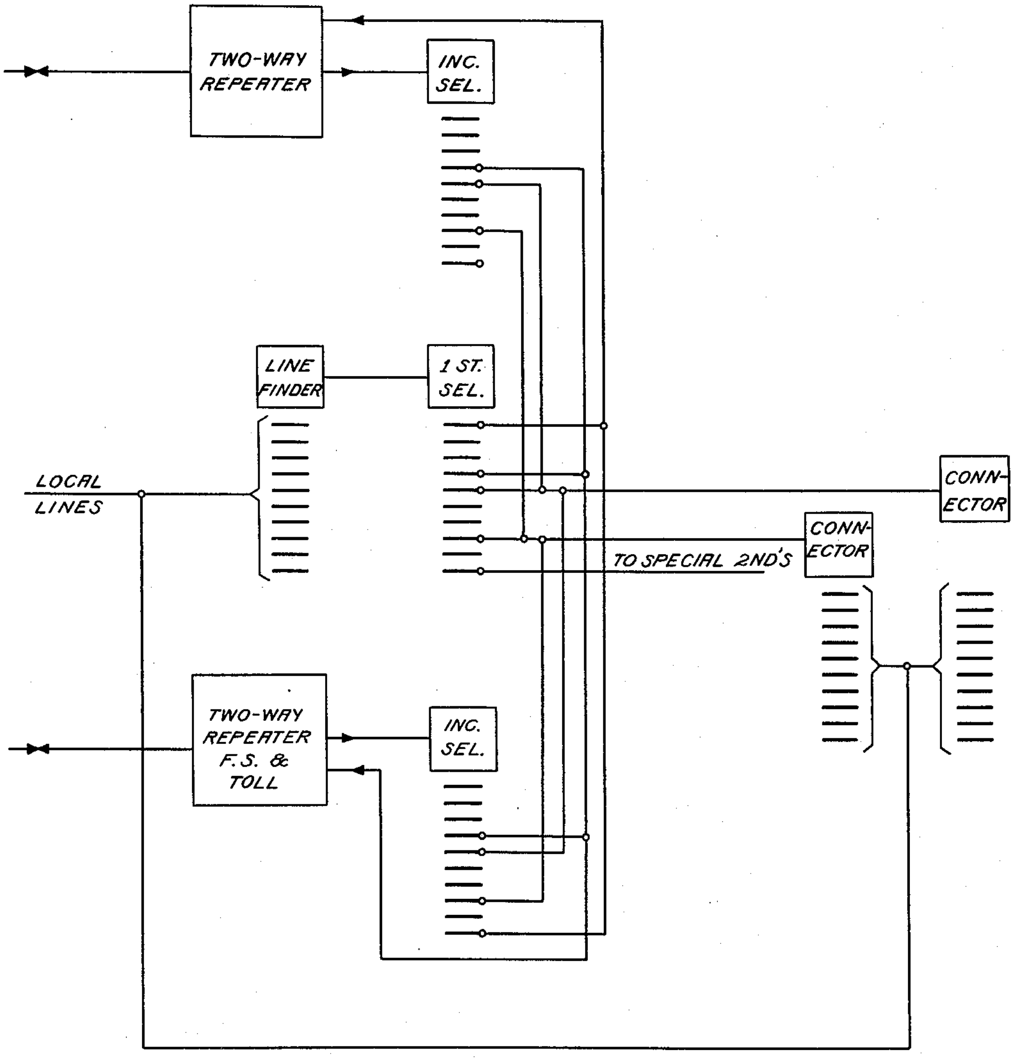

Other objects and features of the invention will be understood from a consideration of the following specification when read in connection with the accompanying drawings, comprising Figs. 1–4, which show by means of the usual schematic diagrams sufficient portions of an automatic telephone system to enable one skilled in the art to understand the invention. Figs. 1 and 2 show, by means of the usual block diagram and single wire connections, the layout of a particular system in which the present connector may be usefully employed. The toll office, illustrated in the upper portion of Fig. 1, is connected by means of the usual 2-way trunk circuit to an incoming repeater and its associated incoming selector in the tandem office, illustrated in Fig. 2. Local lines in a community dial office illustrated in Fig. 1, are connected to the bank multiple of the line finders and connectors, with each line finder having an associated local first selector which may select a connector of the local group from a particular level, level 2 as indicated, in the local office for local calls. A 2-way trunk between the community dial office and the tandem office has an associated 2-way repeater and its associated incoming selector, the latter having access to the same group of connectors as the local first selector.

In the tandem office, the 2-way repeaters associated with the trunks to the toll and community dial offices have their associated incoming selectors, while the local first selectors have their associated line finders with bank multiples corresponding to the two groups of connector bank multiples illustrated in the right hand portion of Fig. 2, it being assumed that there are two local groups of connectors in the tandem office. The third and sixth levels of the first selectors and the incoming selectors are connected in common to two groups of local connectors. The seventh level of all selectors is connected to the 2-way repeaters associated with trunks leading to the community dial office. The first level of the local first selectors leads to special second selectors for providing special services such as calls to information, complaint, wire chief and the like. The tenth level of the local first selectors leads to the trunks extending to the toll office so that local calls in the tandem office are established to the toll office by dialing 0. In order to make use of regular trunks between the community dial office and the tandem office on toll calls, the 0 level of the selectors in the community dial office is used for selecting trunks leading to the tandem office which terminate on the lower group of incoming selectors of Fig. 2. When one of these trunks is selected in the community dial office, an automatic sending operation is effected for causing the incoming selector to take one step for selecting the first level, this level being multipled to the 0 level of the local first selectors for selecting trunks to the toll office. This particular feature is not shown in detail in the present application, since it will be specifically described and claimed in the above mentioned Pharis copending application.

Figure 3:
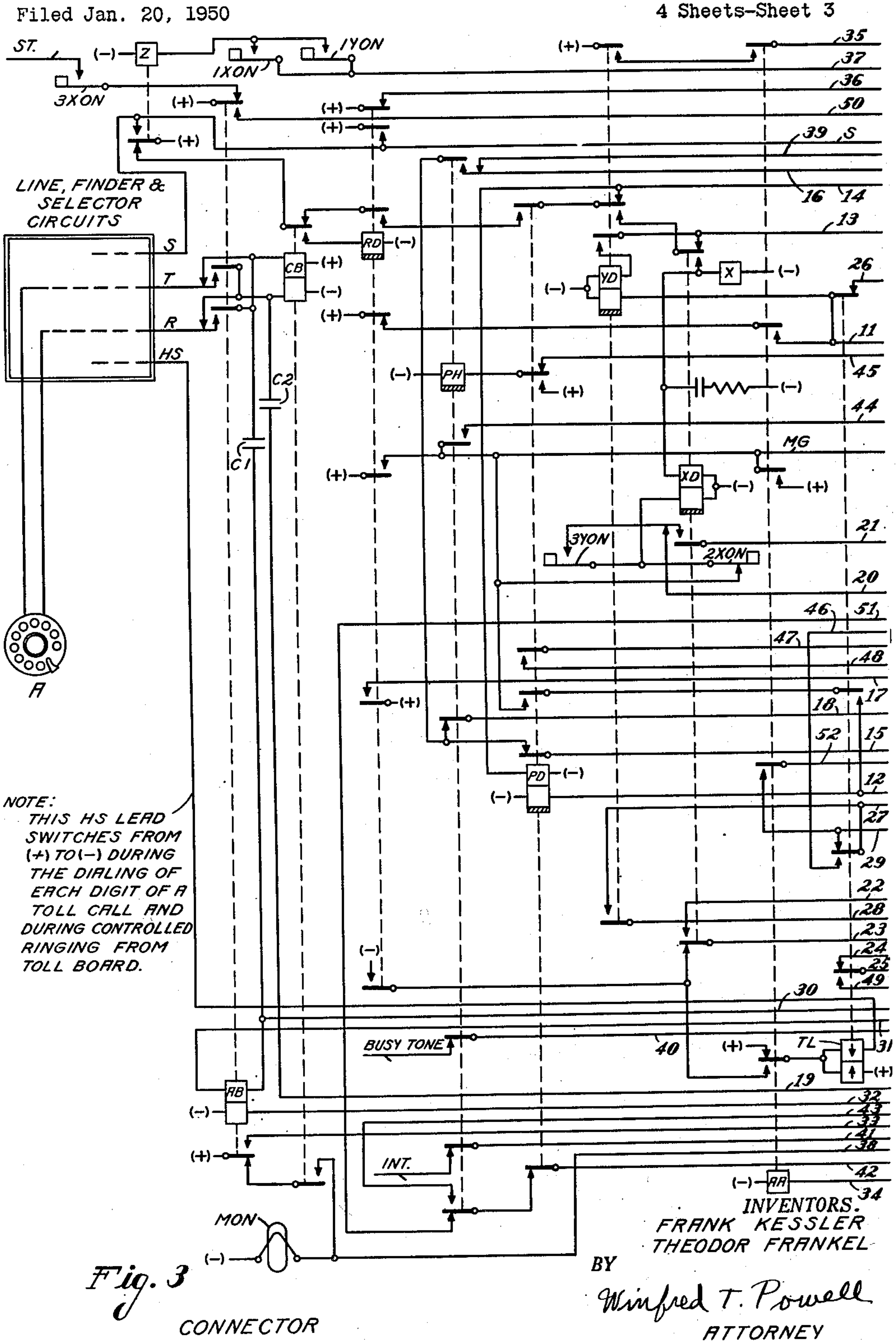
Figure 4:
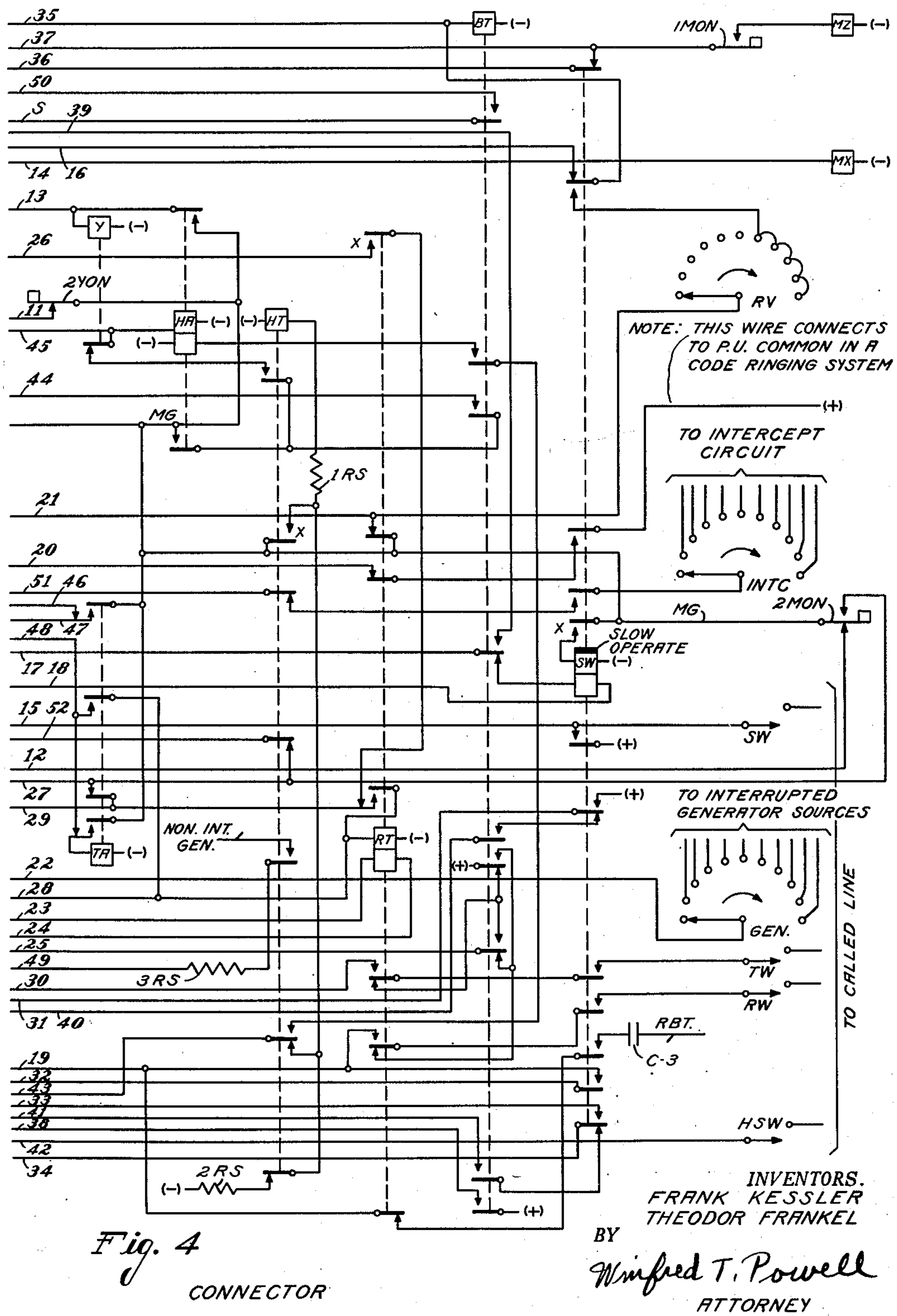

Figs. 3 and 4 illustrate the detailed circuits of the connector of the present invention. It is believed that the operation of the system disclosed will be best understood by describing in detail the relays, the switch and the circuit operations when a call is extended from calling line A of Fig. 3 through the usual line, line finder and selector circuits (not shown in detail) to a connector. Then a toll call will be described.

In the operation of the system in which the illustrated connector is used, the special HS control conductor, shown in the left hand portion of Fig. 3 incoming to the connector, is normally connected to (+) at the repeater in the tandem office and is switched from (+) to (—) in this repeater during impulsing on a toll call, in accordance with the note appearing in the left hand portion of Fig. 3. It will be understood that this HS conductor is carried from the repeater (on an incoming toll call), through the incoming selector HS wiper and its associated bank to the selected connector. The HS wiper and HS conductor are not used on an incoming selector of a free service trunk, neither are they used on the local first selectors.

When the calling party removes the receiver and dials the proper digit or digits for effecting a connection with the connector circuit, the closed circuit across the calling line operates relay CB, this circuit being traced from (+), upper winding of relay CB, break contact of relay AB, tip conductor T, through the selector, finder and line circuits, by way of the calling substation and back over conductor R, break contact of relay AB and lower winding of relay CB to (—). Relay CB closes a circuit for operating relay RD which may be traced from (+), break contact of connector release magnet Z, make contact of relay CB and winding of relay RD to (—). The operation of relay CB also closes a circuit for lighting monitor lamp MON extending from (+), break contact of relay AB, make contact of relay CB and lamp MON to (—), it being understood that this circuit to (—) may lead to a common relay which is connected to other monitor lamps for controlling a common signal or the like.

The operation of relay RD applies (+) potential to incoming sleeve conductor S for making this connector busy and for holding purposes in the well known manner. Relay RD also applies (+) potential to master ground conductor MG for controlling and locking purposes as will be later described. X delay relay XD is now operated over a circuit which may be traced from (+) on conductor MG, X off-normal break contact 2XON, and lower winding of relay XD to (—). Relay YD is also operated at this time over a circuit extending from (+) on conductor MG, Y off-normal contact 2YON, conductor 11 and lower winding of relay YD to (—). Relay PD is likewise operated at this time over a circuit extending from (+) on conductor MG, minor switch off normal contact 2MON, conductor 12 and lower winding of relay PD to (—). Relay PD closes an obvious circuit for operating relay PH.

In this description, it will be assumed that this is a selector type system, consequently no dial tone circuit is required in the connector, the dial tone being supplied in the first selector of the switch train. The calling subscriber now dials the first or tens digit into the connector for effecting the step by step operation of the connector switch in its X or primary direction. It will be assumed that the tens digit comprises one impulse, consequently relay CB will be released once to repeat this impulse and will then remain energized until the next digit is dialled. The release of relay CB opens up the above described circuit for relay RD, but this relay is not released because of its slow acting characteristics. The release of relay CB also opens up the monitor lamp circuit, thus flashing this lamp as an indication that dialling is taking place on the connector. The release of relay CB also closes a circuit for operating X stepping magnet X which may be traced from (+), break contact of magnet Z, break contact of relay CB, make contact of relay RD, make contact of relay PD, make contact of relay YD, make contact of relay XD and winding of magnet X to (—). It will be seen that magnet X is connected in multiple with the upper winding of relay XD, thus providing a circuit for energizing relay XD at each impulse of the tens series for holding this relay operated until the tens digit series of impulses is terminated, at which time relay XD is released. The original energizing circuit for relay XD is opened when the switch takes its first X step. Since it was assumed that one impulse was transmitted for the tens digit, the switch is advanced to the first level where it awaits the units digit. As soon as the switch takes its first step off normal, start conductor ST is energized over a circuit extending from (+), break contact of relay AB, X off normal contact 3XON and common start conductor ST, this circuit being for the purpose of starting up the ringing and tone machines if such start operation is provided in the system.

It will be assumed that the units digit comprises one impulse, consequently relay CB will repeat this one impulse to the Y or secondary stepping magnet over a circuit which may be traced from (+), break contact of magnet Z, break contact of relay CB, make contact of relay RD, make contact of relay PD, make contact of relay YD, break contact of relay XD, conductor 13 and winding of stepping magnet Y to (—). It will be noted that the upper winding of relay YD is connected by way of a make contact of this relay in multiple with magnet Y. Consequently relay YD will be locked operated during the Y stepping operation and will then be released shortly after this stepping operation is terminated. The original operating circuit of relay YD is opened when the switch takes its first Y step.

This advances the connector to the terminal of the called line. The station digit is now dialled and it will be assumed that this digit comprises one impulse, thus effecting the single release of relay CB for operating minor switch stepping magnet MX over a circuit which may be traced from (+), break contact of magnet Z, break contact of relay CB, make contact of relay RD, make contact of relay PD, break contact of relay YD, conductor 14 and winding of magnet MX to (—). It will be noted that the upper winding of relay PD is connected in multiple with magnet MX, consequently relay PD will be maintained operated during the transmission of the station digit because of its slow acting characteristics and will be released shortly after the termination of this digit. The release of relay PD opens up and releases relay PH. It will be understood that relay RD is held energized during the transmission of the units and station digits because its circuit is not opened for a sufficiently long period of time to permit it to release. Furthermore, the above described circuit to lamp MON is intermittently energized during impulsing of the units and station digits.

The called line is now tested to determine whether it is idle or busy. This test is made by connecting sleeve wiper SW, which is in contact with the sleeve terminal of the called line, to busy test relay BT during the interval between the release of relay PD and the release of PH. This circuit may be traced from wiper SW, conductor 15, break contact of relay PD, make contact of relay PH, conductor 16, break contact of relay SW and winding of relay BT to (—). When relay PH releases, this test circuit to the winding of the BT relay is opened. It will first be assumed that the called line is idle, consequently, no (+) potential will be found on the terminal to which wiper SW is connected so that relay BT will not be energized. Now when relay PH is released, a circuit is closed for operating switching relay SW which may be traced from (+), make contact of relay RD, conductor 17, break contact of relay BT, lower winding of relay SW, conductor 18, break contact of relay PH, break contact of relay PD, conductor 15, wiper SW and associated terminal and winding of the cut off relay of the called line to (—). Relay SW is operated over this circuit and closes a locking circuit for itself extending from (+) on conductor MG, X make contact and upper winding of relay SW to (—). The operation of relay SW connects direct (+) to wiper SW for applying a direct (+) potential to the sleeve terminal of the called line for making this line busy and for operating the cut off relay.

The operation of relay SW connects intercept wiper INTC of the minor switch to the HSW wiper of the connector for controlling the intercept circuit. Since this particular intercept circuit arrangement has been disclosed in a prior application and is not a part of the present invention, its operation will not be explained. The operation of relay SW connects ring back tone to the calling subscriber as an indication that the called line has been selected and is being rung. This circuit may be traced from the source of ring back tone RBT, condenser C3, make contact of relay SW, break contact of relay RT, conductor 19, talking condenser C2 and break contact of relay AB to the ring side of the calling line.

The operation of relay SW also closes a circuit for again operating relay XD extending from (+), make contact of relay SW, break contact of relay RT, conductor 20, break contact of relay XD, Y off normal contact 3YON and lower winding of relay XD to (—). Relay XD closes a locking circuit for itself which may be traced from (+) on conductor MG, break contact of relay RT, conductor 21, make contact of relay XD, Y off normal contact 3YON and lower winding of relay XD to (—). Although the circuit just described for operating relay XD extends from direct (+) at a make contact of relay SW, it will be understood that a pick-up (+) pulse may be substituted for this direct pulse in a code ringing system to make certain that the ringing of the called station is not started during a code ringing interval but must wait until the beginning of this interval as marked by the application of this pick-up pulse. Consequently, in a code ringing system, the XD relay serves the additional purpose of a pick-up relay.

In the event that the station digit comprises six or more impulses, relay BT will be operated for reversing the connection of the ringing generator to the called line, thus this BT relay serves as a reversing relay in a divided circuit ringing system. The contacts of the BT relay reverse the generator circuit to the called line, this circuit being pointed out in detail in connection with the application of the ringing signal to the line on the present call. The circuit for operating relay BT may be traced from (+) on conductor MG, break contact of relay RT, minor switch reversing wiper RV, make contact of relay SW and winding of relay BT to (—). In this example it was assumed that the first digit was 1 (less than 6) consequently, relay BT is not operated over the above described circuit. The ringing circuit may be traced from the selected source of interrupted generator, by way of the terminal and wiper GEN of the minor switch (set by the station digit), conductor 22, make contact of relay XD, conductor 23, lower winding of relay RT, conductor 24, break contact of relay TL, conductor 25, break contact of relay BT, break contact of relay RT, make contact of relay SW, wiper RW and terminal, over the called line and substation circuits in series, terminal and wiper TW, make contact of relay SW, break contact of relay RT and break contact of relay BT to (+). It will be obvious that selective ringing may be applied to the called line by the selection of any one of five different harmonic ringing sources for ringing over the ring side of the line in the present example, or for ringing over the tip side of the line if relay BT is operated as above described.

When the called party answers, the closed direct current path across the called line operates relay RT by way of its lower winding included in the above described ringing circuit. This relay operates only one step in response to the answering of the called party and closes its X contact only. A circuit is now closed for again operating relay YD which may be traced from (+) on conductor MG, minor switch off normal contact 2MON, break contacts of relays TA and TL in multiple, conductor 29, break contact of relay RT, X make contact of relay RT, conductor 26, break contact of relay TL and lower winding of relay YD to (—). The operation of relay YD closes a circuit for energizing the upper winding of relay RT for fully operating this relay, this circuit being traced from (+) on conductor MG, minor switch off normal contact 2MON, conductor 27, make contact of relay YD, conductor 28 and upper winding of relay RT to (—). Relay RT locks itself operated over the above described circuit including conductors MG and 29 by way of its continuity and make contact. The complete operation of relay RT terminates the application of ringing current to the line and opens up the above described circuits to the XD and YD relays for effecting the release of these relays. The closed circuit across the called line is now extended by way of make contacts of the RT relay to the windings of the AB relay for operating this relay, this circuit being traced from the tip side of the called line, wiper TW, make contact of relay SW, make contact of relay RT, conductor 30, upper winding of relay AB, conductor 31 and make contact of relay SW to (+). The ring side of the called line extends through wiper RW, make contact of relay SW, make contact of relay RT, another make contact of relay SW, conductor 32 and lower winding of relay AB to (—). The called line and the calling line conductors are connected together through condensers C1 and C2 to provide a conversational circuit. The operation of relay AB closes a circuit for operating relay AA which may be traced from (+), make contact of relay AB, conductor 33, make contact of relay SW, conductor 34 and winding of relay AA to (—). The operation of relay AB reverses the battery back to the calling line for supervisory purposes. The operation of relay AA switches the incoming HS conductor from (+) to (—), through the upper winding of relay TL for supervision, if and when provided on the HS conductor. The operation of relay AA closes a circuit to the winding of relay BT extending from (+), make contact of relay YD, make contact of relay AA, conductor 35 and winding of relay BT to (—), this circuit being opened when relay YD is released, thus relay BT is only momentarily operated and performs no function at this time. It will be seen that the operation of relay AB opens up the above described circuit to lamp MON for extinguishing this lamp. The momentary operation of relay BT again energizes the lamp circuit momentarily and when relay BT is released the lamp is extinguished.

Conversation over the established connection now takes place and it will be first assumed that the called party hangs up first. This opens up and releases relay AB for opening up and releasing relay AA. The release of relay AB again closes the circuit for lighting lamp MON as an indication that the called party has hung up but the calling party is still on the line. The release of relay AB straightens out the battery supply to the calling line for supervisory purposes and the release of relay AA switches incoming conductor HS back to (+) for supervision over this HS conductor when provided.

When the calling party hangs up, relays CB and RD are released. The release of relay CB extinguishes lamp MON and the release of relay RD disconnects (+) from the incoming sleeve conductor S and from master ground conductor MG. This de-energization of conductor MG opens up and releases relays SW and RT, the release of relay SW removing (+) from wiper SW. The release of relay SW closes an energizing circuit for the XY switch release magnet Z and for the minor switch release magnet MZ, this circuit being traced from (+), break contact of relay RD, conductor 36, break contact of relay SW, conductor 37, X and Y off normal contacts 1XON and 1YON in multiple and winding of magnet Z to (—). Magnet MZ is connected in multiple with this circuit by way of minor switch off normal contact 1MON for energizing the MZ magnet. These magnets release their respective switches and when these switches are restored to normal, the above described circuits are opened for de-energizing the magnets. The operation of magnet Z applies (+) potential to incoming sleeve conductor S for protecting the associated connector against seizure while the release operation is taking place.

It will now be explained how the connector operates when the calling party hangs up first, following the establishment of a talking connection. This is the called party holding operation, whereby the connector switch is held in connection with the called line when the calling party hangs up while the called party is still on the line. Referring to the previous description, it will be recalled that, during a talking connection relays CB, RD, SW, RT, AB and AA are in their operated positions, with relays XD, YD, PD, PH and BT in their released positions. Furthermore, at this time, lamp MON is de-energized, the incoming sleeve conductor S and the master ground conductor MG are energized. The SW wiper is connected to (+) at a make contact of relay SW. Under this condition, when the calling party hangs up, relay CB is released in response to the opening of the calling line circuit and this relay in turn opens up and releases relay RD. The release of relay RD removes (+) from incoming sleeve conductor S for effecting the release of the selector, the finder and the line circuit connected to this particular connector. Following the release of relay RD, (+) is maintained on conductor MG at a make contact of relay AA. The release of relay RD closes a circuit for operating relay YD which may be traced from (+), break contact of relay RD, make contact of relay AA and lower winding of relay YD to (—). Relay YD closes a circuit for operating relay BT extending from (+), make contacts in series of relays YD and AA, conductor 35 and winding of relay BT to (—). Relay BT applies (+) to incoming sleeve conductor S for guarding the connector against seizure over a circuit which may be traced from (+), make contact of relay AB, conductor 50 and make contact of relay BT to conductor S. The monitor lamp is again energized over a circuit extending from (+) at a make contact of relay BT and conductor 33 to the lamp circuit to provide a visual indication that the connector is being held by the called party.

Now when the called party hangs up, relay AB is released by the opening of the called line circuit and this relay in turn opens up and releases relay AA. Relay AA removes (+) from conductor MG for de-energizing and releasing relays YD, SW, BT and RT. The release of relay AB also opens up the above described energizing circuit for incoming sleeve conductor S, but this conductor is immediately re-energized when connector release magnet Z is operated over a circuit extending from (+), break contact of relay RD, conductor 36, break contact of relay SW, conductor 37, X and Y off normal contacts 1XON and 1YON in multiple and winding of magnet Z to (—). Since minor switch magnet MZ is connected in multiple with magnet Z, the minor switch is also released at this time. When each of these switches is restored to normal, the associated release magnet is de-energized for restoring the connector and minor switch circuits to their normal positions ready for use on another call. The monitor lamp MON is de-energized by the release of relay BT.

It will now be explained how the circuits operate when the called line is busy. Following the station digit, during the interval between the release of relay PD and the release of relay PH, the called line test is made as previously described. (+) potential is found on the sleeve terminal when a busy line is called, this potential effecting the operation of relay BT over a circuit which may be traced from (+) on the terminal in contact with sleeve wiper SW, conductor 15, break contact of relay PD, make contact of relay PH, conductor 16, break contact of relay SW and winding of relay BT to (—). Relay BT operates and locks itself operated when relay PH releases, by way of a circuit extending from (+), make contact of relay RD, conductor 17, make contact of relay BT, conductor 39, break contact of relay PH, conductor 16, break contact of relay SW and winding of relay BT to (—). The operation of relay BT opens up the lower winding of relay SW to make sure this relay does not operate during this call. Busy tone is connected to the calling line over a circuit which may be traced from the source of busy tone, break contact of relay PH, conductor 40, make contact of relay BT, break contact of relay SW, conductor 31, upper winding of relay AB, condenser C1, break contact of relay AB and over the calling line and substation circuits in series. Flash busy is also effective by means of the intermittent operation of relay AA over a circuit extending from common interrupter INT, break contact of relay PH, conductor 41, make contact of relay BT, break contact of relay SW, conductor 34 and winding of relay AA to (—). The intermittent operation of relay AA switches incoming conductor HS from (+) at the break contact of relay AA to (—) at the make contact of relay RD for providing a busy flash signal by way of conductor HS to a trunk circuit which may be used in a call to a busy line. When the calling party hangs up the receiver, following the receipt of the busy signal, relays CB and RD are released for effecting the release of the connector switch and circuits in the previously described manner.

It will now be explained how the P. B. X hunting feature of the connector operates. In this case, the busy test is made between the release of relay PD and the release of relay PH so that relay BT will be operated as previously described, if the first line of the P. B. X group is busy when selected. The conductor to which wiper HSW is connected for the first line of the P. B. X group is connected to (+) and the HS and S contacts associated with the last line of the P. B. X group are tied together through a comparatively high resistance, for example, 4,000 ohms.

This (+) potential on the first HS terminal of the P. B. X group closes a circuit by way of wiper HSW, conductor 42, break contact of relay PD, make contact of relay PH, conductor 43, break contact of relay HT, resistor 1RS and winding of relay HT to (—). Relay HT is operated and locked over a circuit extending from (+) on conductor MG, X make contact of relay HT, resistor 1RS and winding of relay HT to (—). Resistor 2RS connected through a break contact of relay HT to the above described operating circuit for relay HT is for timing the operation of this relay. A circuit is now closed for operating relay HA which may be traced from (+) on conductor MG, make contact of relay PH, conductor 44, make contact of relay BT, make contact of relay HT, break contact of magnet Y and upper winding of relay HA to (—). This same circuit locks relay PH over a circuit which may be traced from (+) on conductor MG, over the above described circuit to the winding of relay HA and thence by way of conductor 45, break contact of relay PD and winding of relay PH to (—). Consequently, when the first terminal of the P. B. X group is found busy, relays HT, HA and PH are operated.

The Y magnet is now energized over a circuit which may be traced from (+) on conductor MG, make contact of relay HA and winding of magnet Y (—). The operation of the Y magnet opens up the above described circuit to the HA and PH relays for effecting the release of relay HA, relay PH not being released because of its slow acting characteristics. The release of relay HA opens up the above described operating circuit for the Y magnet for releasing this magnet. If wiper SW is now in contact with another busy terminal, (+) on this terminal will be effective to hold relay BT operated for again energizing relay HA and for locking relay PH over the above described circuits. The energization of relay HA again energizes the Y magnet for causing the switch to take another step. This intermittent operation of the HA relay and the Y magnet continues as long as relay BT is energized, this relay being energized as long as a busy trunk is tested and the PH relay being energized as long as relay BT indicates a busy trunk being tested.

When the idle line of the group is reached, there is no (+) on wiper SW for holding relay BT, this relay releases and opens up the above described circuit for relays HA and PH, thus preventing the operation of the HA relay and permitting relay PH to release. This stops the Y stepping operation and when relay PH is released, the circuit to relay SW is closed for operating and locking this relay as previously described. This seizes the called line, ringing is applied to this line and the talking circuit is established, all in the previously described manner.

In the event that the last line in the P. B. X group is busy when relay HA operates to energize the Y magnet for stepping the switch on to the terminals of this line, relay HA is held operated over a circuit which may be traced from (+) on the sleeve terminal of the busy line, through the resistance which bridges the SW and HSW terminals of the last line of the P. B. X group, terminal and wiper HSW, conductor 42, break contact of relay PD make contact of relay PH, conductor 43, make contact of relay HT, make contact of relay BT and lower winding of relay HA to (—). Relay PH is locked operated at this time over its previously described locking circuit. This holds relay HA and magnet Y energized until relay PH releases and opens up the circuit to the HA relay. Relay PH is released (after a slight delay) because its operating circuit is held open at the break contact of the Y magnet. The release of relay PH opens up and releases relay HA, relay HT remaining locked operated and relay BT now being locked operated over a circuit extending from (+), make contact of relay RD, conductor 17, make contact of relay BT, conductor 39, break contact of relay PH, conductor 16, break contact of relay SW and winding of relay BT to (—). This places the circuits in the same condition previously described in connection with a call to a busy line for preventing the operation of the SW relay, for applying the flash busy and the busy tone to the calling line. Relay HT remains locked over the previously described locking circuit but the operation of this relay at this time is of no effect.

It will now be explained how the circuits operate in connection with a toll call. When the operator sets up the connection by way of the trunk circuit and the associated repeater and incoming selector in the tanden office for selecting the connector illustrated in Figs. 3 and 4, the closed circuit across the incoming T and R conductors to the connector effects the operation of relay CB, after which relays RD, XD, YD, PD and PH are all operated in the previously described manner. Similarly, monitor lamp MON, incoming sleeve conductor S and master ground conductor MG are energized as previously described.

When the tens digit is dialled, the CB relay follows the impulses of this digit for flashing the monitor lamp, for locking relay XD until the end of the tens digit and for stepping the switch in its primary or X direction, all in the previously described manner. In this case, however, the HS lead incoming to the connector is switched from (+) to (—) during the dialling of each digit, this switching operation being effected in the repeater circuit in a manner which is clearly explained in the above mentioned Pharis copending application. When conductor HS is switched from (+) to (—), relay TL of Fig. 3 is operated because its upper winding is energized over the HS conductor. At the end of the tens digit the HS conductor is switched back to (+) for effecting the release of the TL relay. This operation of the TL relay performs no function at this time. When the units digit is dialled, relay CB again responds to the impulses of this digit for flashing lamp MON, for locking relay YD in its operated position until the end of this digit and for operating the secondary or Y magnet of the switch. Relay TL is again operated but performs no function at this time.

When the station digit is dialled, relay CB responds to the impulses of this digit for flashing lamp MON, for locking relay PD and for operating magnet MX of the minor switch, all in the previously described manner. At this digit, relay TL is again operated and at this time it closes a circuit for operating relay TA which may be traced from (+) on conductor MG, minor switch off normal contact 2MON, conductor 27, make contact of relay TL, conductor 46, break contact of relay TA, conductor 47, make contact of relay PD, conductor 48, break contact and winding of relay TA to (—). Relay TA closes a locking circuit for itself extending from (+) on conductor MG, make contact and winding of relay TA to (—). A second locking circuit for relay PD is now closed which may be traced from (+) on conductor MG, make contact of relay PD, make contact of relay TL and lower winding of relay PD to (—). Relay RT is now operated over a circuit extending from (+) on conductor MG, make contact of relay TA, conductor 47, make contact of relay PD, conductor 48, make contact of relay TA and upper winding of relay RT to (—). When relay TL releases to mark the end of the station digit, the above described second locking circuit for relay PD is opened for effecting the release of this relay which in turn opens up and releases relay PH. When relay PH releases, the above described circuits are closed for operating and locking relay SW.

In the event that this is a call to a local line (not a P. B. X line), relay RT remains operated until the operator effects the ringing control operation i. e. ringing is prevented, even though additional digit impulses are transmitted from the calling line until the operator desires to effect ringing. This operation is accomplished by switching conductor HS in the repeater from (+) to (—) in response to the operation of the ringing key. This circuit operation is not shown in the present disclosure but is described in the above mentioned Pharis copending application. This switch from (+) to (—) on conductor HS again operates relay TL for opening up the locking circuit for the RT relay, thus effecting the release of this latter relay. This RT relay locking circuit was completed by the release of relay TL following the end of the station digit and may be traced from (+) on conductor MG, minor switch off normal contact 2MON, conductor 27, break contact of relay TL, conductor 29, make contact and upper winding of relay RT to (—). The release of relay RT, in response to the operation of relay TL when the operator rings, effects the application of automatic ringing current to the called line. This ringing circuit may be traced from the selected source of the interrupter generator minor switch wiper GEN, conductor 22, make contact of relay XD (operated in response to the operation of relay SW over the previously described circuit), conductor 23, lower winding of relay RT, conductor 24, break contact of relay TL, conductor 25, break contact of relay BT, break contact of relay RT, make contact of relay SW, wiper RW and associated terminal, over the called line and substation circuits in series, terminal and wiper TW, make contact of relay SW, break contact of relay RT and break contact of relay BT to (+). It will be obvious that this application of the ringing current to the called line will be reversed, as previously described, if the station digit is any number from 6 to 0, because relay BT will then be operated. When the call is answered, relay RT is operated and locked in the previously described manner. If the called party hangs up on a connection of this type, the operator can re-ring by effecting the operation of the TL relay in the previously described manner for opening up and releasing relay RT which resets the ringing circuit.

In the event that this is a call to a P. B. X line, relay HT is operated and locked when relay PD releases and before relay PH releases, following the station digit, over a circuit which may be traced from (+) on the terminal to which wiper HSW is connected (the terminal associated with the first line of a P. B. X group being connected permanently to (+)), wiper HSW, conductor 42, break contact of relay PD, make contact of relay PH, conductor 43, break contact of relay HT, resistor 1RS and winding of relay HT to (—). Relay HT closes a locking circuit for itself extending from (+) on conductor MG, X make contact of relay HT, resistor 1RS and winding of relay HT to (—).

Now when the operator rings on this connection, relay TL is operated for releasing relay RT, thus closing a circuit for ringing on the called line, this circuit being traced from the source of the non-interrupted generator, make contact of relay HT, resistor 3RS, conductor 49, make contact of relay TL, conductor 25, break contact of relay BT, break contact of relay RT, make contact of relay SW, wiper RW and associated terminal, called line and substation circuits in series, terminal and wiper TW, make contact of relay SW, break contact of relay RT and break contact of relay BT to (+). It will thus be seen that the operator can control the application of this ringing current to the called line in accordance with the ringing key operation. In other words, this circuit does not set the ringing circuit of the connector for applying interrupted generator to the called line but it controls the application of non-interrupted generator to the called line each time the ringing key is operated. When the call is answered, with relay HT operated, relay RT is operated over a circuit which may be traced from (+), break contact of relay BT, break contact of relay RT, make contact of relay SW, wiper TW and associated terminal, called line and substation circuits in series, terminal and wiper RW, make contact of relay SW, break contact of relay RT, break contact of relay BT, conductor 25, break contact of relay TL, conductor 24, lower winding of relay RT, conductor 23, break contact of relay XD and make contact of relay RD to (—). Relay RT locks operated over the previously described circuit. In the event that the called line extends to a P. B. X trunk line to which a closed loop is connected, the operator can ring on this closed loop. This is because, even though relays AB and AA are operated because the connection is extended to a closed loop circuit, relay TL can be operated when the HS conductor is switched from (+) to (—), since this switch in potential short circuits the upper winding of the TL relay for causing it to operate by way of its lower winding over a circuit extending from (+), lower winding of relay TL, make contact of relay AA and make contact of relay RD to (—). With conductor HS normally connected to (+) (no ringing operation effected) relay TL is not operated because the circuit through both of its windings to (—) at the lower-most make contact of relay RD energizes these windings in opposition, as indicated by the arrows, and since this is a differential relay it will not operate under this condition. This operation of relay TL in connection with a closed called loop effects the release of relay RT and the application of the non-interrupted generator current to the called line in the previously described manner.

In connection with a toll call through the connector, the answering, the talking and the release operations function in the previously described manner, with relays TA and HT being released when relay RD is released for deenergizing conductor MG. In connection with this circuit operation for permitting the distant toll operator to cause the connector to ring into a closed loop circuit associated with the called line, this closed loop circuit may be a cord circuit in the P. B. X connected to the incoming line circuit and the distant operator may wish to ring into the closed loop provided by the cord circuit to signal the P. B. X operator in the event that the called local station in the P. B. X has hung up the receiver. It will be understood that the loop circuit to the P. B. X is not closed when there is no plug in the jack associated with this line. This permits the release of the AB and AA relays when the operator at the P. B. X takes down the connection, thus (+) is removed from conductor MG for effecting the release of the connector and its associated circuits.

This invention is not limited in its application to the particular system herein described, since it may be applied to any system in which the disclosed features are desirable.

What we claim is:

1. In a telephone system, a connector switch, means for seizing said connector switch by a calling line and for controlling its operation by digital impulses transmitted from said calling line to connect with the terminals of a called line, means including a guarding relay operated when said connector switch is seized for applying a guarding potential to a guarding conductor associated with said connector switch to prevent its seizure by another calling line, means controlled by the calling party restoring the receiver for releasing said guarding relay, means for signalling a party on a called line if idle when connected with, a busy relay, means for connecting said busy relay to be operated to apply a busy signal to said calling line in case said called line is busy when connected with, called party holding means for preventing the release of said connector switch when the calling party restores the receiver before the called party, means controlled by said holding means for operating said busy relay when said calling party restores the receiver while said called party is on the line, and means controlled by the operation of said busy relay while said called party is on the line for applying said guarding potential to said guarding conductor.

2. In a telephone system, a connector switch, means controlled by certain digital impulses transmitted from a calling line for operating said switch to connect with a called line, a delay relay controlled in response to said certain digital impulses to mark the end of a digit, signalling means for ringing over said called line if it is idle, means responsive to the transmission of additional digit impulses thereafter from said calling line for preventing the application of said signalling means, and means for thereafter re-operating said delay relay to connect said signalling means to said called line when idle.

3. In a telephone system, a connector switch, means controlled by certain digital impulses transmitted from a calling line for operating said switch to connect with a called line, a first delay relay and a second delay relay, means for operating said delay relays, means controlled in response to each of two separate digits for releasing each of said delay relays one at the end of each digit, whereby any additional impulse or impulses for the associated digit is rendered ineffective, signalling means for ringing over said called line if it is idle, means for again operating said first delay relay to connect said signalling means to said called line when idle, and means for again operating said second delay relay in order to effect the disconnection of said signalling means from said called line.

4. In a connector switch for use in telephone systems, means for stepping said switch into connection with called line terminals, a change over relay in said switch having two windings, means for initially operating said change over relay by energizing its first winding, means for subsequently de-energizing said first winding and for maintaining said change over relay operated by energizing its second winding during the stepping operation of said switch, means for de-energizing said second winding for releasing said change over relay at the termination of said stepping operation, a switching relay in said switch for connecting the circuits of said connector switch to an idle called line, means for operating said switching relay, means controlled by the operation of said switching relay for again operating said change over relay by again energizing its first winding, and means controlled by the second operation of said changeover relay for applying ringing current to said called line.

5. In a connector switch for use in telephone systems, a change over relay in said switch having two windings, means for initially operating said change over relay by energizing its first winding, means for subsequently de-energizing said first winding and for maintaining said change over relay operated by energizing its second winding during the stepping operation of said switch, means for de-energizing said second winding for releasing said change over relay at the termination of said stepping operation, a switching relay in said switch for connecting the circuits of said connector switch to an idle called line, means for operating said switching relay, means controlled by the operation of said switching relay for subsequently operating said change over relay, and means controlled by the subsequent operation of said change over relay for applying ringing current to said called line.

6. In an automatic switch having primary and secondary operating magnets, a control circuit, a change over control relay, a first energizing circuit for said change over relay for switching said control circuit from said primary magnet to said secondary magnet, a second energizing circuit for said change over relay for again operating said change over relay upon the extension of a call to a called line, a ring cut off relay operated responsive to the re-operation of said change over relay and to the answering of a call to a called line in said switch, and means responsive to the operation of said ring cut off relay for opening said second circuit for releasing said changeover relay.

7. In a telephone system, an automatic switch arranged to be controlled over a trunk line extending thereto from an operator's position to set up connections to called lines, means for applying ringing current to a called line from said automatic switch, a ring cut off relay in said automatic switch operated when a closed direct current path is set up over said called line for disconnecting said ringing current, means controlled from said operator's position for thereafter releasing said ring cut off relay, and means controlled by said last-mentioned means for reapplying ringing current to said called line while said direct current path is set up.

8. In a telephone system; an automatic switch arranged to be controlled over a trunk line extending thereto from an operator's position to set up connections to called lines; a tip conductor, a ring conductor, a hold conductor and a control conductor incoming to said switch; a relay in said switch operated when a connection is extended thereto from said operator's position; means controlled over said tip and ring conductors for applying ringing current to a called line from said automatic switch; a ring cut off relay in said switch operated when a closed direct current path is set up over said called line for disconnecting said ringing current; and means controlled over said control conductor for releasing said ring cut off relay to re-apply said ringing current to said called line while said direct current path is set up.

9. In a telephone system, a called local line and a called P. B. X line, an automatic switch arranged to be controlled by a local call or a toll call to set up a connection to a called line, means responsive to the setting up of a local connection to said called local line when idle for applying interrupted ringing current by way of said switch to said called local line, means in said switch operated in response to a toll call for preventing the application of said interrupted ringing current to said called P. B. X line, means in said switch responsive to a manual control in connection with said toll call for effecting the application of said interrupted automatic ringing current to a called local line, and means in said switch responsive to said manual control for effecting the application of non-interrupted ringing current to said called P. B. X line.

10. In a telephone system, an automatic switch arranged to be controlled by a local call or a toll call to set up a connection to a called line, means responsive to the setting up of a local connection to said called line when idle for applying interrupted ringing current by way of said switch to said called line, means in said switch for preventing the application of said interrupted ringing current to said called line on a toll call, means in said switch responsive to a manual control in connection with said toll call for effecting the application of said interrupted automatic ringing current to said called line, means for marking called lines, and means in said switch responsive to said manual control for effecting the application of non-interrupted automatic ringing current to a marked called line only.

11. In a telephone system, a calling line and a called line, a connector switch having a stepping magnet, means controlled by a series of impulses transmitted from said calling line for operating said stepping magnet to advance said switch into connection with terminals connected to said called line, a delay relay, means controlled by said series of impulses for causing said delay relay to mark the end of said series and to prevent the operation of said stepping magnet by an additional impulse or impulses transmitted from said calling line following said series, a ring cut-off relay, means including contacts of said ring cut-off relay for applying ringing current to said called line, means for re-operating said delay relay in response to the answering of a call by the called party on said called line, and means controlled by the re-operation of said delay relay for operating said ring cut-off relay, and means responsive to the operation of said ring cut-off relay for terminating the application of said ringing current to said called line.

12. In a telephone system, a calling line and a called line, a connector switch having a stepping magnet, means controlled by a series of impulses transmitted from said calling line for operating said stepping magnet to advance said switch into connection with terminals connected to said called line, a delay relay, means controlled by said series of impulses for causing said delay relay to mark the end of said series and to prevent the operation of said stepping magnet by an additional impulse or impulses transmitted from said calling line following said series, a two-step ring-cut-off relay, means including contacts of said ring cut-off relay for applying ringing current to said called line, means for operating said ring cut-off relay to its first step in response to the answering of a call by the called party on said called line, means controlled by the operation of said ring cut-off relay to said first step for operating said delay relay, means controlled by the operation of said delay relay for operating said ring cut-off relay to its second step, and means controlled by the operation of said ring cut-off relay to its second step for terminating the application of said ringing current to said called line.

13. In a telephone system, a calling line and a called line, a connector switch having a stepping magnet, means controlled by a series of impulses transmitted from said calling line for operating said stepping magnet to advance said switch into connection with terminals connected to said called line, a delay relay, means controlled by said series of impulses for causing said delay relay to mark the end of said series and to prevent the operation of said stepping magnet by an additional impulse or impulses transmitted from said calling line following said series, a two-step ring cut-off relay, means including contacts of said ring cut-off relay for applying ringing current to said called line, means for operating said ring cut-off relay to its first step in response to the answering of a call by the called party on said called line, means controlled by the operation of said ring cut-off relay to said first step for operating said delay relay, means controlled by the operation of said delay relay for operating said ring cut-off relay to its second step, means controlled by the operation of said ring cut-off relay to its second step for terminating the application of said ringing current to said called line, and means controlled by the operation of said ring cut-off relay to its second step for completing a talking circuit between said calling and said called lines.

14. In a telephone system, a calling line and a called line, a connector switch having a stepping magnet, means controlled by a series of impulses transmitted from said calling line for operating said stepping magnet to advance said switch into connection with terminals connected to said called line, means including a guarding relay operated when said switch is seized for marking said switch busy to prevent its seizure by another calling line, means controlled by the calling party restoring the receiver for releasing said guarding relay, a delay relay, means controlled by said series of impulses for causing said delay relay to mark the end of said series and to prevent the operation of said stepping magnet by an additional impulse or impulses transmitted from said calling line following said series, called party holding means for preventing the release of said switch when the calling party restores the receiver before the called party, means controlled by said holding means for operating said delay relay when said calling party restores the receiver while said called party is still on the line, and means controlled by said operation of said delay relay for marking said switch busy to prevent its seizure by another calling line.

15. In a telephone system, a calling line and a called line, a connector switch having a stepping magnet, means controlled by a series of impulses transmitted from said calling line for operating said stepping magnet to advance said switch into connection with terminals connected to said called line, means including a guarding relay operated when said switch is seized for applying a guarding potential to a guarding conductor connected to said switch to prevent its seizure by another calling line, means controlled by the calling party restoring the receiver for releasing said guarding relay, a delay relay, means controlled by said series of impulses for causing said delay relay to mark the end of said series and to prevent the operation of said stepping magnet by an additional impulse or impulses transmitted from said calling line following said series, called party holding means for preventing the release of said switch when the calling party restores the receiver before the called party, means controlled by said holding means for operating said delay relay when said calling party restores the receiver while said called party is still on the line, and means controlled by said operation of said delay relay for applying said guarding potential to said guarding conductor to prevent its seizure by another calling line.

16. In a telephone system, a calling line and a called line, a connector switch having a stepping magnet, means controlled by a series of impulses transmitted from said calling line for operating said stepping magnet to advance said switch into connection with terminals connected to said called line, means including a guarding relay operated when said switch is seized for marking said switch busy to prevent its seizure by another calling line, means controlled by the calling party restoring the receiver for releasing said guarding relay, a delay relay, means controlled by said series of impulses for causing said delay relay to mark the end of said series and to prevent the operation of said stepping magnet by an additional impulse or impulses transmitted from said calling line following said series, means for signaling a party on said called line if idle when said switch connects with said terminals, a busy relay operated to apply a busy signal to said calling line in case said called line is busy when said switch connects with said terminals, called party holding means for preventing the release of said switch when the calling party restores the receiver before the called party, means controlled by said holding means for operating said delay relay when said calling party restores the receiver while said called party is still on the line, means controlled by said last mentioned operation of said delay relay for operating said busy relay, and means controlled by said last mentioned operation of said busy relay for marking said switch busy to prevent its seizure by another calling line.

FRANK KESSLER.
THEODOR FRANKEL.

References Cited in the file of this patent

UNITED STATES PATENTS

| Number | Name | Date |
|---|---|---|
| 2,239,902 | Peterson | Apr. 29, 1941 |
| 2,419,282 | Ostline | Apr. 22, 1947 |
| 2,506,730 | Morris | May 9, 1950 |
| 2,524,131 | Molnar | Oct. 3, 1950 |